| United States Patent | [15] | 3,647,412 |
|---|---|---|
| Brown, Jr. et al. | [45] | Mar. 7, 1972 |

[54] PROCESS FOR PRODUCING AMMONIUM NITRATE, CALCIUM CARBONATE MIXED FERTILIZER PRILLS AND RESULTING PRODUCT

[72] Inventors: Marion L. Brown, Jr.; Albert W. Green; Elmer L. Blanton, all of Yazoo City, Miss.

[73] Assignee: Mississippi Chemical Corporation, Yazoo City, Miss.

[22] Filed: June 20, 1969

[21] Appl. No.: 835,213

[52] U.S. Cl. ............................................71/59, 71/35, 71/60, 71/64 E
[51] Int. Cl. ................................................C05c 1/02
[58] Field of Search ...................23/103; 71/35, 59, 60, 64 E

[56] References Cited

UNITED STATES PATENTS

| 2,657,977 | 11/1953 | Stengel et al. ..........................23/103 |
| 2,912,318 | 11/1959 | Kieweg ..................................71/60 X |
| 3,317,276 | 5/1967 | Brown et al. ...........................23/103 |
| 3,421,878 | 1/1969 | Zahnstecher ............................71/60 |

*Primary Examiner*—Reuben Friedman
*Assistant Examiner*—Bennett H. Levenson
*Attorney*—Oblon, Fisher & Spivak

[57] ABSTRACT

Particulate ammonium nitrate, calcium carbonate mixed fertilizer compositions are rendered more resistant to caking, less hygroscopic and less sensitive to crystal-type transitions and less free ammonia is formed during their production by the addition of 0.1 to 0.2 percent by weight diammonium phosphate, 0.068 to 0.135 percent by weight boric acid or an ammonium or alkali metal salt thereof, and 0.005 to 0.01 percent ammonium sulfate to the molten or aqueous ammonium nitrate prior to the addition of finely divided calcium carbonate.

2 Claims, No Drawings

3,647,412

PROCESS FOR PRODUCING AMMONIUM NITRATE, CALCIUM CARBONATE MIXED FERTILIZER PRILLS AND RESULTING PRODUCT

SUMMARY OF INVENTION

This invention relates to novel particulate ammonium nitrate, calcium carbonate mixed fertilizer compositions, more particularly to ammonium nitrate, calcium carbonate mixed fertilizer compositions rendered more stable by the presence therein of monoammonium or diammonium phosphate and preferably also, boric acid, an ammonium or alkali metal salt thereof, and ammonium sulfate and to their production by the addition of the ammonium phosphate to the ammonium nitrate prior to the addition of the calcium carbonate thereto.

BACKGROUND OF THE INVENTION

Ammonium nitrate fertilizer compositions are subject to changes in crystalline structure during production and storage as the $NH_4NO_3$ passes through its crystalline transition temperatures. Transitions in crystal structure result in dust and fines being produced from the breakdown of the ammonium nitrate crystal during storage and subsequent handling. Due to the hygroscopic nature of ammonium nitrate, the compositions tend to cake on standing.

Similar problems also exist with mixed ammonium nitrate fertilizer compositions containing large amounts, e.g., up to 60 percent by weight, of calcium carbonate, usually in the form of limestone. Such fertilizers are popular, especially abroad, for the acid-neutralizing properties of limestone when applied to the soil and the diluent properties of the limestone. Attempts to solve these stability problems have been made. See, e.g., U.S. Pat No. 2,079,324, wherein finely divided calcium carbonate was introduced into a hot solution of ammonium nitrate in an attempt to produce a more stable product. However, the problem remains as a serious one today.

Various methods and chemicals have been used to stabilize ammonium nitrate by adding materials to increase physical stability. In U.S. Pat No. 3,317,276, boric acid and its alkali-metal and ammonium salts are used. In U.S. Pat. No. 2,957,763 a mixture with ammonium salts of phosphoric and/or sulfuric acids are used.

When boric acid, diammonium phosphate, diammonium sulfate of a mixture thereof was added to molten ammonium nitrate, calcium carbonate mixed fertilizer compositions, a more stable product was produced but prills produced from the composition were swollen and soft. Also, the product still had the typical and objectionable acrid smell of ammonia, indicating loss of nitrogen values due to the known reaction of the calcium carbonate with the ammonium nitrate.

Suprisingly, it was found that varying the order of mixing of the stabilizing chemical and calcium carbonate, i.e., by adding the stabilizing chemical or chemicals to the ammonium nitrate before the addition of the calcium carbonate, resulted in a greatly improved product. The prills thus produced were much more stable to thermal shock. Moreover, the prills did not smell of ammonia, a problem long recognized in the art of making $NH_4NO_3$-$CaCO_3$ mixed fertilizers. U.S. Pat. No. 2,079,324 states a smell of ammonia sometimes adheres to the product long after production and employs a special procedure to rid the fertilizer of the ammonia odor, which is annoying the produces production problems.

OBJECTS OF THE INVENTION

It is an object of this invention to produce ammonium nitrate, calcium carbonate mixed fertilizer composition less hygroscopic, more resistant to caking and physical decomposition on handling and storage.

Another object of this invention is to reduce the problems associated with the release of free ammonia from ammonium nitrate, calcium carbonate mixed fertilizer compositions during production and storage.

Another object of this invention is to provide a selection of suitable additives and ranges thereof to produce a stabilized $NH_4NO_3$-$CaCO_3$ mixed fertilizer, the amount of additive material or materials varying directly with the number of temperature changes and amount of handling to which the fertilizer is subjected.

Still another object is to produce a harder prill or pellet.

Further objects of this invention will be apparent to those skilled in the art to which this invention pertains.

DESCRIPTION OF INVENTION

An unexpected result is obtained when particulate $NH_4NO_3$-$CaCO_3$ mixed fertilizers are produced in accordance with the process of this invention. NOt only is the final product more stable in that it resists physical degradation due to thermal and mechanical shock, but no ammonia odor is experienced during or after the formation of the fertilizer composition.

These results are achieved by adding monoammonium or diammonium phosphate and preferably also boric acid or an an ammonium or alkali-metal salt thereof and/or ammonium sulfate.

Molten or an aqueous solution of ammonium nitrate, preferably molten, e.g., containing at least 90 percent and preferably at least 94 percent, ammonium nitrate, is employed. It can be heated to a temperature above the melting point of $NH_4NO_3$ and maintained at that elevated temperature while being stirred. The stabilizing agent is then added to the molten or aqueous solution of $NH_4NO_3$.

Calcium carbonate, usually ground limestone, is next added, preferably in finely divided form to facilitate suspension throughout the mixture. The proportions of ammonium nitrate and calcium carbonate may be varied within wide limits. Thus, from 90 to 30 parts by weight of $NH_4NO_3$, and from 10 to 70 parts by weight of calcium carbonate can be used. The preferred ratio of $NH_4NO_3$ to $CaCO_3$ is about 3:1 by weight.

This sequence of addition of the ingredients is essential to the production of the highly stabilized fertilizer compositions of this invention.

The resulting stabilized ammonium nitrate, calcium carbonate mixed fertilizer composition is then converted to particulate form, that is in the form of separate, discrete macroparticles, such as prills, granules or pellets, and preferably prills, as opposed to powdered ammonium nitrate or solutions thereof.

The amount of ammonium phosphate which gives optimum stabilization will vary with the conditions employed. When used alone as the stabilizing agent, from about 0.1 to 0.5 percent, preferably about 0.2 to 0.3 percent by weight calculated on the final $NH_4NO_3$-$CaCO_3$ mixture, gives optimum results. When used with boric acid, ammonium borate or an alkali metal salt thereof lesser amounts, e.g., from 0.05 to 0.5 percent, calculated as free boric acid, can be used, the preferred amount being from about 0.1 to 0.3 percent. Diammonium phosphate gives better results than monoammonium phosphate. The amount of boric acid or salt thereof used is generally an amount which provides 0.03 to 0.2 percent, preferably about 0.05 to 0.15 percent, boric acid in the final mixture. The amount of ammonium sulfate used is usually from about 0.005 to 0.5 percent, preferably about 0.015 to 0.2 percent. Generally, the total amount of additive which gives optimum results is less than 0.5 percent, e.g., from about 0.1 to 0.4 percent by weight, calculated on the final $NH_4NO_3$-$CaCO_3$ mixture.

The preferred stabilizing agent is a mixture of boric acid, ammonium borate or alkali-metal borate, ammonium sulfate, and diammonium phosphate. Best results are obtained when the percentage by weight of the above ingredients in the final $NH_4NO_3$-$CaCO_3$ mixture is 0.135 percent, 0.01 percent, and 0.2 percent, respectively. The liquid mixture is maintained at a temperature which retains it in a fluid state, and mixed until the stabilizing ingredients are thoroughly dispersed in the ammonium nitrate.

The following examples are illustrative of the process and products of this invention which is not limited thereto. All percentages are by weight, calculated on the final $NH_4NO_3$-$CaCO_3$ mixture.

In the examples which follow, each sample was prepared in the following manner unless otherwise indicated. Ammonium nitrate of C.P. grade, 99.7 percent was melted, the desired amounts of boric acid or salts thereof, ammonium phosphate, ammonium sulfate, herein described as additives and expressed in percentage by weight in Tables I through VII, were added to the molten ammonium nitrate. The resulting mixture was stirred until the additive was dissolved, then C.P. calcium carbonate was added in a ratio of 1 part of calcium carbonate to 3 parts of ammonium nitrate, with continued stirring. A slurry resulted after the addition of calcium carbonate. The slurry was placed in droplets on a cool sheet of Teflon (polyfluorohydrocarbon) and the droplets were allowed to solidify into prills (pellets). The solidified pellets were then subjected to shaking the temperature transitions in the following manner.

In each test 25 of the ammonium nitrate, calcium carbonate prills produced as described above were placed in sealed screw-top glass containers and the containers were placed in an oven for 2 hours at 110° F. The containers with contents were then removed from the oven and cooled to 70° F. During this cooling period the containers were shaken vigorously on a Burrell laboratory shaker for 30 minutes. Then the containers were maintained at 70° without shaking for 1.5 hours. At the end of this period the containers were returned to the oven maintained at 110° F. and the heating and cooling steps were repeated. Each complete cycle of heating and cooling thus involved two III–IV crystal-type transitions. AFter each cycle (two transitions), the prills were examined for breakage. The number of prills was multiplied by a factor of 4 to give the percentage of pellets broken by thermal shock or shaker tests.

The thermal shock and shaker test is an accelerated version of the storage and handling conditions to which fertilizer is usually subjected during storage and affords an accurate method of evaluating the storage and handling properties of the fertilizer compositions.

AFFECT OF ORDER OF ADDITION

Table I shows the affects of varying the sequence of addition in the production of ammonium nitrate, calcium carbonate stabilized fertilizer compositions according to the invention. Sample A contained no additives, only ammonium nitrate and calcium carbonate. Sample B was prepared by first mixing the calcium carbonate with the ammonium nitrate, then mixing in the additives. Note that the prills thus produced pursuant to Sample B tolerated substantially more transitions than the untreated prills of Sample A. Samples 1 and 2 were prepared in accordance with the invention by adding the stabilizing agent to the molten ammonium nitrate before the calcium carbonate. Samples 1 and 2 also show the relative stabilizing effect of $(NH_4)_2HPO_4$ and $NH_4H_2PO_4$.

TABLE I

Affect of Sequence of Addition
Percent Prills Broken by 90° F. Thermal Shock & Shaker Test

| Sample No. | A | B* | 1** | 2** |
|---|---|---|---|---|
| % $H_3BO_3$ | 0 | 0.135 | 0.135 | 0.135 |
| % $(NH_4)_2SO_4$ | 0 | 0.01 | 0.01 | 0.01 |
| % $(NH_4)_2HPO_4$ | 0 | 0.2 | – | 0.2 |
| % $NH_4H_2PO_4$ | – | – | 0.2 | – |
| No. of Transitions | Percent Prills Broken | | | |
| 10 | 0 | 0 | 0 | 0 |
| 50 | 100 | 28 | 0 | 0 |
| 100 | | 100(90 trans.) | 0 | 0 |
| 200 | | | 40 | 4 |
| 300 | | | 68 | 12 |
| | | | 100(320 trans.) | 24(400 trans.) |
| | | | | 32(500 trans.) |
| | | | | 100(560 trans.) |

*Additives added after $CaCO_3$ in sample.

**Additive added before $CaCO_3$ in sample.

Affect of Amounts of Additives

Table II shows the range and affect of different levels of boric acid, ammonium sulfate and ammonium phosphate additives. All of the additives were effective in improving the quality of product produced without additives (Sample A).

TABLE II

Affect of Additive Level
Percent Prills Broken by 90° F. Thermal Shock & Shaker Test

| Sample No. | A | 3 | 4 | 5 | 6 |
|---|---|---|---|---|---|
| % $H_3BO_3$ | 0 | 0.135 | 0.034 | 0.068 | 0.2 | 0.2 |
| % $(NH_4)_2SO_4$ | 0 | 0.01 | 0.0025 | 0.005 | 0.2 | 0.1 |
| % $(NH_4)_2HPO_4$ | 0 | 0.2 | 0.05 | 0.1 | 0.2 | 0.3 |
| No. of Trans. | Percent Prills Broken | | | | |
| 10 | 0 | 0 | 0 | 0 | 0 | 0 |
| 20 | 4 | 0 | 0 | 0 | 0 | 0 |
| 30 | 32 | 0 | 8 | 0 | 0 | 0 |
| 40 | 96 | 0 | 24 | 0 | 0 | 0 |
| 50 | 100 | 72 | 0 | 0 | 0 | 0 |
| 60 | – | 0 | 88 | 0 | 4 | 0 |
| 70 | | 0 | 100 | 0 | 16 | 84 |
| 80 | | 0 | – | 0 | 84 | 100 |
| 90 | | 0 | | 0 | 100 | |
| 100 | | 0 | | 4 | | |
| 150 | | 0 | | 8 | | |
| 200 | | 4 | | 12 | | |
| 250 | | 8 | | 60 | | |
| | | | | 100(280 trans.) | | |
| | | 12(300 trans.) | | | | |
| | | 24(400 trans.) | | | | |
| | | 32(500 trans.) | | | | |
| | | 100(560 trans.) | | | | |

As can be clearly seen from the Table II, Examples 2 and 4 compositions show unexpectedly superior results as compared with all of the other compositions tested. These compositions are capable of withstanding 280–560 temperature transitions before complete breakage, as compared with 50–80 transitions for comparable compositions.

Example 2 indicates the percent by weight content of the stabilizing components in the ammonium nitrate, calcium carbonate composition as 0.135 boric acid, 0.01 percent ammonium sulfate and 0.2 percent diammonium phosphate.

Similarly, the percentage weight content of the components as shown by Example 4 are 0.068 percent boric acid compound, 0.005 percent ammonium sulfate and 0.1 percent diammonium phosphate.

In summarizing Examples 2 and 4, it is apparent that the percent weight content of these components comprises the ranges 0.068 to 0.135 percent boric acid compound, 0.005 to 0.01 percent ammonium sulfate and 0.1 to 0.2 percent diammonium phosphate.

The unforseen extent of stabilizing superiority afforded by the respective contents, of these two examples is in essence suggestive of critical significance.

Affect of Mixture of $(NH_4)_2HPO_4$ and $H_3BO_3$

Table III shows the affects of various mixtures of boric acid and ammonium phosphate. The effectiveness of the mixture decreases if the $(NH_4)_2HPO_4$ additive level exceeds about 0.3 percent.

TABLE III

Affect of Mixtures of $H_3BO_3$ and $(NH_4)_2HPO_4$
Percent Prills Broken by 90° F. Thermal Shock & Shaker Test

| Sample No. | A | 7 | 8 | 9 | 10 |
|---|---|---|---|---|---|
| % $H_3BO_3$ | 0 | 0.034 | 0.068 | 0.135 | 0.2 |
| % $(NH_4)_2SO_4$ | | | | | |
| % NG | 0 | — | — | — | — |
| % $(NH_4)_2HPO_4$ | 0 | 0.05 | 0.1 | 0.2 | 0.5 |

| No. of Trans. | Percent Prills Broken | | | | |
|---|---|---|---|---|---|
| 10 | 0 | 0 | 0 | 0 | 0 |
| 20 | 4 | 0 | 0 | 0 | 4 |
| 30 | 32 | 0 | 0 | 0 | 4 |
| 40 | 96 | 24 | 0 | 0 | 80 |
| 50 | 100 | 64 | 0 | 0 | 100 |
| 60 | — | 84 | 0 | 0 | — |
| 70 | | 100 | 0 | 0 | |
| 80 | | | 0 | 0 | |
| 90 | | | 0 | 0 | |
| 100 | | | 0 | 0 | |
| | | | 8(200 trans.) | 0(200 trans.) | |
| | | | 36(250 trans.) | 0(250 trans.) | |
| | | | 100(290 trans.) | 4(300 trans.) | |

Affect of Mixtures of $(NH_4)_2HPO_4$ and $(NH_4)_2SO_4$

Table IV shows the effect of ammonium sulfate and ammonium phosphate in stabilizing ammonium nitrate, calcium carbonate fertilizer mixtures.

TABLE IV

Affect of Mixtures of $(NH_4)_2SO_4$ and $(NH_4)_2HPO_4$
Percent Prills Broken by 90° F. Thermal Shock & Shaker Test

| Sample No. | A | 11 | 12 | 13 | 14 |
|---|---|---|---|---|---|
| % $H_3BO_3$ | 0 | — | — | — | — |
| % $(NH_4)_2SO_4$ | 0 | 0.01 | 0.1 | 0.2 | 0.5 |
| % $(NH_4)_2HPO_4$ | 0 | 0.2 | 0.2 | 0.1 | 0.2 |

| No. of Trans. | Percent Prills Broken | | | | |
|---|---|---|---|---|---|
| 10 | 0 | 0 | 0 | 0 | 0 |
| 20 | 4 | 0 | 0 | 0 | 0 |
| 30 | 32 | 0 | 0 | 0 | 0 |
| 40 | 96 | 0 | 0 | 0 | 0 |
| 50 | 100 | 0 | 0 | 0 | 0 |
| 60 | — | 0 | 0 | 0 | 0 |
| 70 | | 0 | 0 | 0 | 0 |
| 80 | | 0 | 0 | 8 | 0 |
| 90 | | 8 | 0 | 32 | 0 |
| 100 | | 12 | 0 | 84 | 0 |
| 110 | | 12 | 0 | 100 | |
| 120 | | 20 | 0 | | |
| 130 | | 44 | 12 | | |
| 140 | | 88 | 16 | | |
| 150 | | 100 | 40 | | |
| 190 | | — | 100 | | |

Affect of $(NH_4)_2HPO_4$

Table V shows the stabilizing affect of diammonium phosphate alone.

TABLE V

Affect of $(NH_4)_2HPO_4$ Alone
Percent Prills Broken by 90° F. Thermal shock & Shaker Test

| Sample No. | A | 15 | 16 | 17 |
|---|---|---|---|---|
| % $H_3BO_3$ | 0 | — | — | — |
| % $(NH_4)_2SO_4$ | 0 | — | — | — |
| % $(NH_4)_2HPO_4$ | 0 | 0.1 | 0.2 | 0.5 |

| No. of Trans. | Percent Prills Broken | | | |
|---|---|---|---|---|
| 10 | 0 | 0 | 0 | 0 |
| 20 | 4 | 4 | 0 | 0 |
| 30 | 32 | 16 | 0 | 0 |
| 40 | 96 | 72 | 0 | 0 |
| 50 | 100 | 92 | 0 | 16 |
| 60 | — | 100 | 0 | 36 |
| 70 | | — | 0 | 100 |
| 80 | | | 0 | |
| 90 | | | 0 | |
| 100 | | | 0 | |
| 150 | | | 0 | |
| 250 | | | 52 | |
| 250 | | | 100 | |

Effect of Combinations of Additives

Table VI shows that certain combinations of additives are more effective than others.

TABLE VI.—EFFECT OF $H_3BO_3$, $(NH_4)_2SO_4$ AND $(NH_4)_2HPO_4$ USED INDIVIDUALLY AND IN COMBINATION

Percent prills broken by 90° F. thermal shock and shaker test

| Sample Number | A | C | D | E | F | 16 | 11 | 12 | 9 | 2 |
|---|---|---|---|---|---|---|---|---|---|---|
| Percent: | | | | | | | | | | |
| $H_3BO_3$ | 0 | 0.135 | | | 0.135 | | | | 0.135 | 0.135 |
| $(NH_4)_2SO_4$ | 0 | | 0.2 | 0.5 | 0.01 | | 0.01 | 0.1 | | 0.01 |
| $(NH_4)_2HPO_4$ | 0 | | | | | 0.2 | 0.2 | 0.2 | 0.2 | 0.2 |

| | Percent prills broken | | | | | | | | | |
|---|---|---|---|---|---|---|---|---|---|---|
| Number of trans.: | | | | | | | | | | |
| 10 | 0 | 0 | 0 | 4 | 0 | 0 | 0 | 0 | 0 | 0 |
| 20 | 4 | 0 | 4 | 80 | 0 | 0 | 0 | 0 | 0 | 0 |
| 30 | 32 | 16 | 12 | 100 | 16 | 0 | 0 | 0 | 0 | 0 |
| 40 | 96 | 88 | 60 | | 80 | 0 | 0 | 0 | 0 | 0 |
| 50 | 100 | 100 | 84 | | 100 | 0 | 0 | 0 | 0 | 0 |
| 100 | | | [1]100 | | | 0 | 12 | [2]12 | 0 | 0 |
| 150 | | | | | | 8 | 100 | | 0 | 0 |
| 200 | | | | | | 52 | | [3]100 | 0 | 4 |
| 250 | | | | | | 100 | | | 0 | 8 |
| 300 | | | | | | | | | 4 | 12 |
| 350 | | | | | | | | | | 20 |
| 400 | | | | | | | | | 12 | 24 |
| 450 | | | | | | | | | | |
| 500 | | | | | | | | | | 32 |
| 550 | | | | | | | | | | [4]100 |

[1] (60 trans.). [2] (130 trans.). [3] (190 trans.). [4] (560 trans.).

Affect of Constant pH

Because the various additives produced mixed fertilizers of different pH's, samples shown therein were prepared and the pH then adjusted so that each would have a pH of 6.8, based on an 8 percent solution. Table VII reflects the results. It shows that even though the pH remains constant, there is a great difference in stability to the thermal shock and shaker test. Stability, therefore, is not due solely to the difference in pH of the various samples.

TABLE VII.—EFFECT OF ADDITIVE COMPOSITION AT CONSTANT pH

Percent prills broken by 90° F. thermal shock and shaker test

| Sample number | A | 16 | 18 | 11 | 12 | 4 | 2 | 1 |
|---|---|---|---|---|---|---|---|---|
| Percent: | | | | | | | | |
| $H_3BO_3$ | 0 | | | | | 0.068 | 0.135 | 0.135 |
| $(NH_4)_2SO_4$ | 0 | | 0.005 | 0.01 | 0.1 | 0.005 | 0.01 | 0.01 |
| $(NH_4)_2HPO_4$ | 0 | 0.2 | 0.1 | 0.2 | 0.2 | 0.1 | 0.2 | |
| $NH_4H_2PO_4$ | | | | | | | | 0.2 |
| Number of Trans.: | | | Percent prills broken | | | | | |
| 10 | 0 | 0 | 0 | 0 | 0 | 0 | 0 | 0 |
| 50 | 100 | 0 | 100 | 0 | 0 | 0 | 0 | 0 |
| 100 | | 0 | | 12 | 0 | 4 | 0 | 0 |
| 150 | | 8 | | 100 | 40 | 8 | 0 | 36 |
| 200 | | 52 | | | [1]100 | 12 | 4 | 40 |
| 250 | | 100 | | | | [2]100 | 8 | 40 |
| | | | | | | | [3]12 | [8]68 |
| | | | | | | | [4]20 | [9]100 |
| | | | | | | | [5]24 | |
| | | | | | | | [6]32 | |
| | | | | | | | [7]100 | |

[1] 190 trans.  [2] 280 trans.  [3] 300 trans.  [4] 350 trans.  [5] 400 trans.
[6] 500 trans.  [7] 560 trans.  [8] 300 trans.  [9] 320 trans.

Caking after Storage Text

Prills produced according to the invention were compared with samples containing no additives, e.g., Sample A of the previous tables, by subjecting them to the following procedure. Two hundred prills were placed in separate glass bottles, 1 inch in diameter and sealed with a screw top, and maintained at a temperature in the range of 65° to 75° F. for a period of 2 weeks. At the end of the 2-week period, the jars were inverted to determine the extent of caking therein. Prills with additives remained free-flowing while those without additives were firmly caked together.

The jars were again inverted to their original position and placed in the same storage area at a temperature in the range of 65° to 75° F. for a period of 2.5 months. At the end of this period the samples were again examined and again the prills produced according to the invention remained free-flowing while the untreated prills did not.

The jars were returned to the same storage area and stored for an additional 3 months, under the same conditions, giving a total storage time of 6 months. The samples were again examined. Pellets without additives were found to be caked and extremely hard. Prill surfaces showed crystal growth. Samples containing additives showed no caking and remained free-flowing at the end of the 6-month storage. The surface of the prills produced according to the invention remained smooth and glossy.

What is claimed is:

1. A method of producing prilled ammonium nitrate, calcium carbonate mixed fertilizers having improved stability which comprises the step of dissolving into molten or aqueous ammonium nitrate, prior to the addition of finely divided calcium carbonate thereto, 0.1 to 0.2 percent by weight diammonium phosphate, 0.068 to 0.135 percent by weight boric acid or an ammonium or alkali metal salt thereof, and 0.005 to 0.01 percent ammonium sulfate, dispersing the calcium carbonate into the liquid mixture, and prilling the admixture, the amounts of said calcium carbonate and said ammonium nitrate being 10 to 70 percent by weight calcium carbonate and 90 t0 30 percent by weight ammonium nitrate, said weight percents being calculated on the final weight of the ammonium nitrate, calcium carbonate mixture.

2. A stabilized prilled ammonium nitrate, calcium carbonate mixed fertilizer having improved stability, produced by the process of claim 1.

* * * * *